(12) United States Patent
Hotta et al.

(10) Patent No.: US 7,830,607 B2
(45) Date of Patent: Nov. 9, 2010

(54) DISPLAY DEVICE, DISPLAY METHOD AND HEAD-UP DISPLAY

(75) Inventors: Aira Hotta, Tokyo (JP); Takashi Sasaki, Kanagawa-ken (JP); Haruhiko Okumura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 55 days.

(21) Appl. No.: 12/407,328

(22) Filed: Mar. 19, 2009

(65) Prior Publication Data

US 2009/0237803 A1    Sep. 24, 2009

(30) Foreign Application Priority Data

Mar. 21, 2008    (JP)    ............................. 2008-074541

(51) Int. Cl.
*G02B 27/14*    (2006.01)
*A61B 3/14*    (2006.01)

(52) U.S. Cl. ...................................... 359/630; 351/210

(58) Field of Classification Search ......... 359/629–632; 351/209–211
See application file for complete search history.

(56) References Cited

U.S. PATENT DOCUMENTS 5,875,018 A * 2/1999 Lamprecht ................... 351/208

FOREIGN PATENT DOCUMENTS

JP    07-228172    8/1995
JP    09-251534    9/1997

* cited by examiner

*Primary Examiner*—William C Choi
(74) *Attorney, Agent, or Firm*—Turocy & Watson, LLP

(57) ABSTRACT

A display device includes: an image projection section configured to project a light flux including an image toward a head of a viewer; an imaging section configured to image a picture of the viewer; a control section configured to control a projection area and a projection position of the light flux by controlling the image projection section on the basis of the picture; and a target eye detection section configured to detect a one-eye served as a target of the projection position of both eyes of the viewer on the basis of the picture.

20 Claims, 10 Drawing Sheets

DISPLAY DEVICE, DISPLAY METHOD AND HEAD-UP DISPLAY

CROSS-REFERENCE TO RELATED APPLICATIONS

This application is based upon and claims the benefit of priority from the prior Japanese Patent Application No. 2008-074541, filed on Mar. 21, 2008; the entire contents of which are incorporated herein by reference.

BACKGROUND OF THE INVENTION

1. Field of the Invention

This invention relates to a display device, a display method and a head-up display.

2. Background Art

There is a head-up display HUD (Head-Up Display) allowing driving information such as vehicle speed and traveling direction indication or the like projected on a windscreen to be viewed and external information and travel information to be visually identified simultaneously.

In a normal HUD a display image is observed by both eyes, however a single eyed HUD which the display image is visually identified by a one-eye is proposed for improving visual identification. For example, JP-A 7-228172 (Kokai)(1995) discloses a technique concerning a single eyed HUD presenting the display image to only one eye of an observer for the sake of preventing double images in visual identification with both eyes. A technique presenting the display image to only one-eye is also investigated for enhancing a sense of depth. Furthermore, in the HUD, whereas display brightness is low relative to bright environment in day time, a probable idea is a display with limiting a display region to a part of eyes, particularly one-eye, to improve the brightness and increasing a life time of a light source.

Thus, in a display device with the display region narrowed, alignment of the display region and the eye is important particularly in the case of visual identification by the one-eye.

Here, in control of position of the display region, it is important to select which eye of right and left eyes as the eye of a mark for the alignment.

That is, it is generally said that a human has a dominant eye (ascendant eye). When the image is visually identified with a one-eye, the visual identification with a one-eye other than the dominant eye may cause a visual rivalry to make the visual identification of the image difficult, however the visual identification with the dominant eye generate little visual rivalry to allow the natural visual identification of the image. Therefore, in a single eyed display device, it is desirable to display the image on the dominant eye. That is, it is desirable to use the dominant eye as a mark of the position of the display region.

One example of detection method of the dominant eye is as follows. For example, first, something to be a mark (what can be seen two or three meters ahead) is indicated with a forefinger, at this time an arm is stretched straight without tilting a face and the forefinger is placed in front of the face. While opening both eyes, focusing on the mark is obtained and the eyes are closed with the pose as it is. Here, an eye presenting the image with smaller displacement from the image with both eyes is the dominant eye. Another example of detection method of the dominant eye is as follows. For example, a suitable mark is seen by both eyes while holding a sheet of paper with a hole of a diameter of 1 to 2 cm with both hands upright. While seeing the mark, the sheet of paper is brought near short (toward the face). When the paper is brought near to the front of the eyes, an eye with which a hole is peeped through turns to be the dominant hole.

Conventionally, there has been no automatic detection method of the dominant eye, thus when the image is projected on the dominant eye in the single eyed display device, it is necessary that the identifier himself sets an eye serving as a mark for control of the position of the display region and it has been inconvenient.

It is noted that JP 3279913 discloses a technique concerning personal identification for specifying location of the identifier.

SUMMARY OF THE INVENTION

According to an aspect of the invention, there is provided a display device including: an image projection section configured to project a light flux including an image toward a head of a viewer; an imaging section configured to image a picture of the viewer; a control section configured to control a projection area and a projection position of the light flux by controlling the image projection section on the basis of the picture; and a target eye detection section configured to detect a one-eye served as a target of the projection position of both eyes of the viewer on the basis of the picture.

According to another aspect of the invention, there is provided a display method, detecting a one-eye with which a viewer views a light flux in a condition that a projection area of the light flux including an image is smaller than an area covering both eyes of the viewer, and adjusting and displaying a projection position of the light flux with setting a target on the detected one-eye.

According to another aspect of the invention, there is provided a head-up display including: a display device including an image projection section configured to project a light flux including an image toward a head of a viewer, an imaging section configured to image a picture of the viewer, a control section configured to a projection area and a projection position of the light flux by controlling the image projection section on the basis of the picture, and a target eye detection section configured to detect a one-eye served as a target of the projection position of both eyes of the viewer on the basis of the picture, and a transparent plate provided with a reflecting layer on which the light flux emitted from the display device is projected.

DETAILED DESCRIPTION OF THE INVENTION

Figure 1:
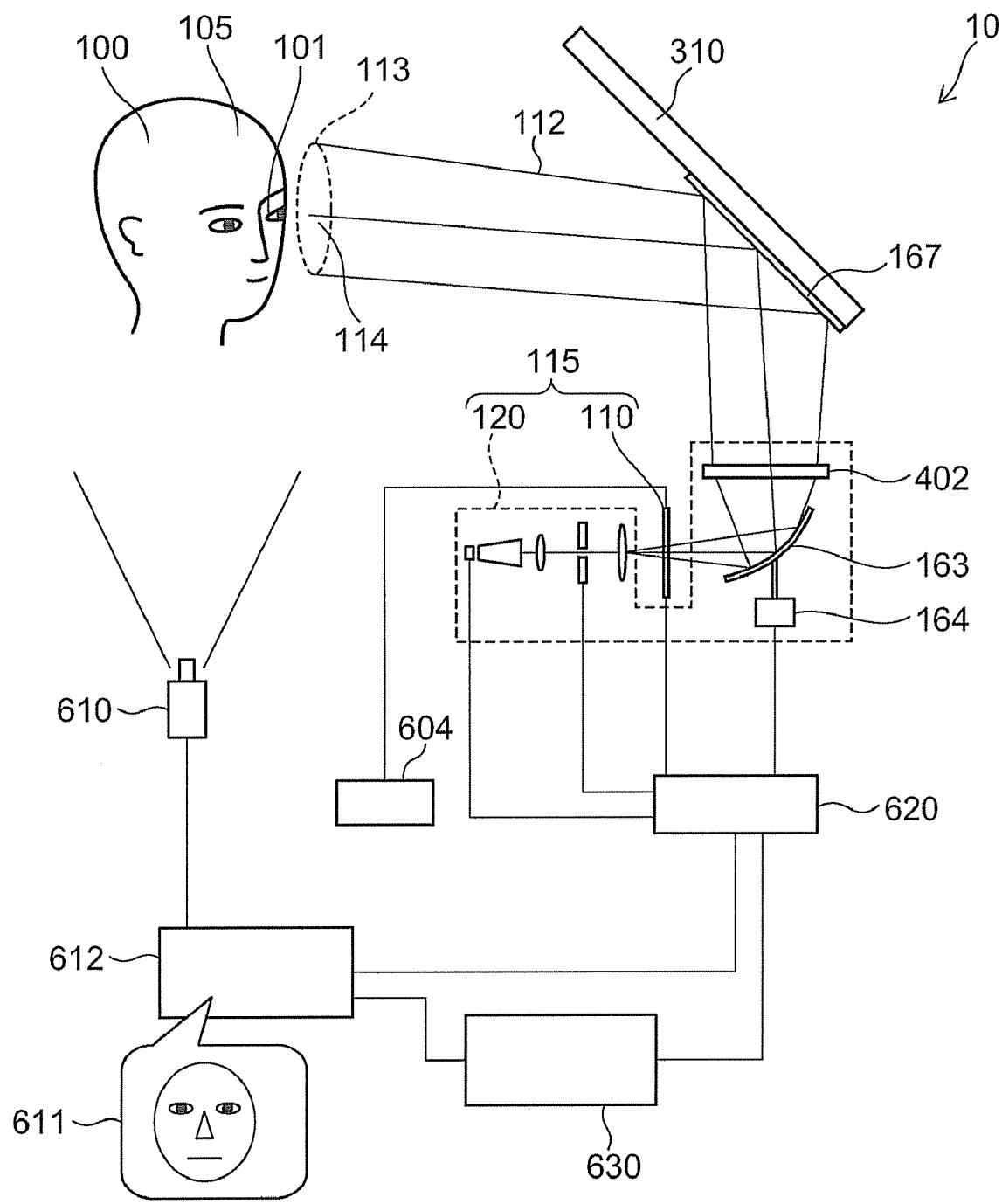
FIG. 1 is a schematic view illustrating the configuration of a display device according to a first embodiment of the invention.

An embodiment of the invention will now be described with reference to the drawings.

With regard to the specification and each figure, elements similar to those described above with reference to figures described previously are marked with the same reference numerals and not described in detail as appropriate.

First Embodiment

FIG. 1 is a schematic view illustrating the configuration of a display device according to a first embodiment of the invention.

As shown in FIG. 1, the display device 10 according to the first embodiment of the invention includes an image projection section 115 projecting a light flux 112 including an image on a head 105 of a viewer 100, an imaging section 610 imaging a picture of the viewer 100, a control section 620 controlling a projection area 113 and a projection position 114 of the light flux 112 by controlling the image projection section 115 on the basis of a picture 611 imaged by the imaging section 610, and a target eye detection section 630 detecting a one-eye 101 of the viewer 100 served as the target of the projection position 114 on the basis of the picture 611 imaged by the imaging section 610. Here, the targeted one-eye 101 of the viewer 100 is typically the dominant eye of any one of both eyes. That is, the target eye detection section 630 estimates the one-eye 101 to be the dominant eye of the viewer 100 and detects it.

The image projection section 115 illustratively includes an image formation section 110 forming an image, and a projection section 120 projecting the light flux 112 including an image on the head 105 of the viewer 100.

The image formation section 110 can be illustratively based on various optical switches such as a liquid crystal display device, DMD (Digital Micromirror Device), MEMS (Micro-electro-mechanical System). An image signal is given to the image formation section 110, for example, from an image signal section 604, and the image formation section 110 forms the image.

The projection section 120 is based on, for example, various light sources, a lens, a mirror and various optical elements controlling an angle of diffusion.

The projection section 120 of the display device 10 illustrated in FIG. 1 is illustratively based on a concave movable mirror 163 (reflector) and the projection position 114 can be varied by changing the angle of the mirror 163.

A light source used for the projection section 120 is based on an LED (Light Emitting Diode), a high-pressure mercury-vapor lamp, a halogen lamp and a laser and so forth. Use of the LED enables the device to be small. Other specific example of the projection section 120 will be described later.

The light flux 112 emitted from the display device 10 is projected on, for example, an reflecting layer 167 provided on a part of a windshield (transparent plate) 310 of a car, the projection image can be visually identified by the viewer, and the display device 10 can be used for HUD.

The display device 10 projects the light flux 112 in the particular projection area 113. For example, the light flux 112 is projected on the one-eye of the viewer 100 who views the image with the one-eye.

At this time, the control section 620 controls the image projection section 115 (mainly projection section 120) so that the projection area 113 and the projection position 114 are precisely adjusted at the eye of the head 105 of the viewer 100. That is, the picture of the head of the viewer 100 is imaged by the imaging section 610 in real time, and the picture is illustratively analyzed and judged by an image judgment section 612 to specify the position of the head (eye) 105 of the viewer 100. In the image judgment by the image judgment section 612, positions of eyeballs of both eyes, a nose and a mouth or the like can be specified as the feature of the face of the viewer 100 on the basis of the imaged data by the face identification technique illustratively described in JP 3279913.

Furthermore, the image can be presented to the one-eye of the viewer 100 by controlling various optical elements of the image projection section 115 (mainly projection section 120) using the control section 620 on the basis of the data about the position of the eye of the viewer 100 derived by the image judgment section 612. For example, in the case of the display device 10 illustrated in FIG. 1, the projection position 114 is controlled by controlling the angle of the mirror 163 through controlling a driving section 164 connected to the mirror constituting a part of the projection section 120.

Thereby, even if the head 105 of the viewer 100 moves, it is possible to follow it automatically and control the presentation position of the image. Thus, misalignment of the presentation position of the image due to the movement of the head of the viewer 100 does not occur and it is possible to broaden the practical viewing area.

Here, the display device 10 according to this embodiment comprises the target eye detection section 630 detecting the one-eye of the viewer 100 served as the target of the projection position 114. That is, the target eye detection section 630 detects automatically the one-eye estimated to be the dominant eye of the viewer 100, and on the basis of this result, the control section 620 controls the projection area 113 and the projection position 114 with setting a target on the detected one-eye, and the image can be projected on the one-eye of the viewer 100.

Thus, the display device 10 according to this embodiment detects the one-eye estimated to be the dominant eye and projects the image on the detected eye, thereby the display device allowing the natural and easily viewable image to be provided can be provided.

In the display device 10 illustrated in FIG. 1, the image judgment section 612 is provided besides the target eye detection section 630, however the target eye detection section 630 may include the image judgment section 612.

Figure 2:
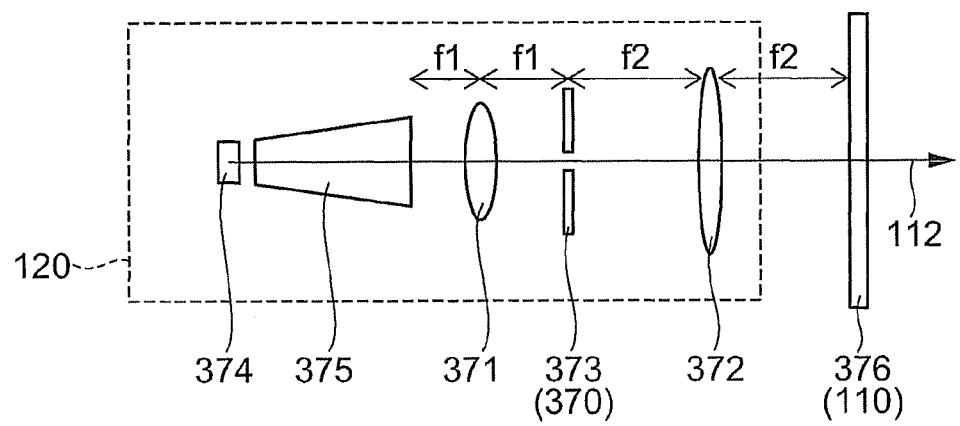
FIG. 2 is a schematic view illustrating the configuration of a part of the display device according to the first embodiment of the invention.

FIG. 2 is a schematic view illustrating the configuration of a part of the display device according to the first embodiment of the invention.

FIG. 2 illustrates the part of the image projection section 115 used for the display device 10 according to this embodiment, namely, the configuration of the part of the projection section 120 and the image formation section 110.

As shown in FIG. 2, the projection section 120 is illustratively based on optical elements of a light source 374, a taper light guide 375, a first lens 371, a variable aperture 373 and a second lens 372. When a focal length of the first lens 371 is f1, and a focal length of the second lens 372 is f2, the variable aperture 373 is placed at a distance of f1 from the first lens and f2 from the second lens 372.

The light flux 112 emitted from the projection section 120 is incident on the image formation section 110. In this example, a liquid crystal display device 376 is used for the image formation section.

The distance from the emitting position of a taper light guide 375 to the first lens 371 is set to be f1 and the distance from the second lens 372 to the liquid crystal display device 376 is set to be f2. This collimates the light flux from the light source 374 at the variable aperture 373 and furthermore the light flux is incident on the image formation section 110 in a state of the angle of diffusion controlled by the second lens 372.

In the above, the light source 374 can be illustratively based on the LED generating the white light flux 112 and the light emitting area is, for example, 4 mm×4 mm. The length of the taper light guide 375 is, for example 50 mm and the area of the emitting portion of the taper light guide 375 is, for example 15 mm×8 mm. Moreover, f1 is illustratively 20 mm. However, this invention is not limited thereto.

As shown in FIG. 1, the projection mirror 120 further includes optical elements such as the mirror 163, a non-spherical Fresnel lens 403 or the like, and the light flux 112 emitted from the image formation section 110 is projected on the viewer 100 as the light flux having the angle of diffusion controlled through these optical elements. Here, by changing a diameter of the variable aperture 373, it is possible to control easily the size of the projection area 113 of the light flux 112, and the light flux 112 can be incident on the particular area, for example, the one eye at the viewer 100.

That is, the projection area 113 is broadened by enlarging the opening diameter of the variable aperture 373 and the projection area 113 is narrowed by reducing the opening diameter, thereby the projection area 113 can be controlled.

The image projection section 115 of the display device 10 according to this embodiment is based on the variable aperture 373 as an angle of diffusion control section 370 controlling the angle of diffusion of the light flux 112.

The non-spherical Fresnel lens 402 described above can be designed to allow controlling the shape of the light flux 112 in accordance with the shape of the windshield 310.

Furthermore, for example, a reflective plane having an optical effect (power) unified with effects of the non-spherical Fresnel lens 402 and the windshield 310 and a movable mirror such that the similar optical effect to the non-spherical Fresnel lens 402 is provided with the movable mirror 163 are also available. When the image is reflected on a non-planar surface, the image is distorted and the position of the image is displaced due to the movement of the head 105, and then it is also possible to achieve the image without the distortion and the displacement by correcting them electrically in advance.

Figure 3A:
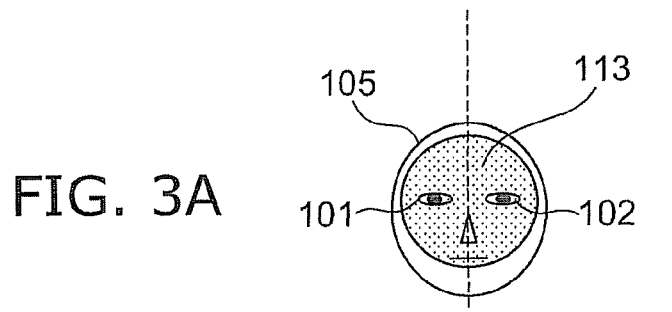
FIGS. 3A to 3C are schematic views illustrating the operation of the display device according to the first embodiment of the invention.
Figure 3B:
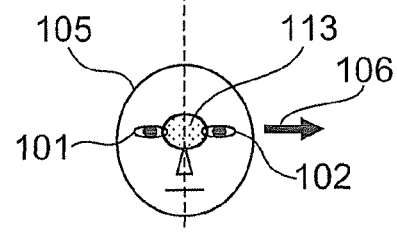
Figure 3C:
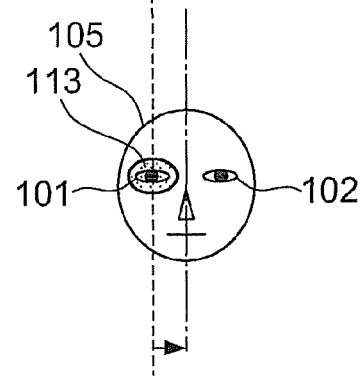

FIGS. 3A to 3C are schematic views illustrating the operation of the display device according to the first embodiment of the invention.

That is, FIGS. 3A to 3C illustrate the operation in detecting the one-eye 101 of the viewer 100 served as the target of the projection position 114 in the display device 10 according to this embodiment.

As shown in FIG. 3A, first, the light flux 112 is projected broadly on the head 105 of the viewer 100. That is, the projection area 113 is so as to cover both eyes of the viewer 100, and then the light flux 112 is projected so that the viewer 100 can view the image with both eyes for a given length of time. For example, the distance between human both eyes is about 65 mm, and thus the variable aperture 373 is controlled so that the width in a horizontal direction of the projection area 113 is set to be 65 mm or more, for example, about 100 mm or more. Moreover, for example, the center position of both eyes of the viewer 100 and the center of the projection area are displayed to coincide with each other. On the basis of the picture of the head of the viewer 100 imaged by the imaging section 610, the position of the head (eye) 105 of the viewer 100 at this time is detected.

As shown in FIG. 3B, the size of the projection area 113 is gradually narrowed, and when the size is reduced to a size which the viewer 100 can not view the image with both eyes, the viewer 100 moves the head 105 in order to view the image with the one-eye. For example, the head is moved to the direction of an arrow 106 illustrated in FIG. 3B.

That is, for example, the opening area of the variable aperture 373 is reduced so that the projection area 113 is gradually reduced toward the center of both eyes of the viewer 100. Here, because the size of the projection area 113 varies, the brightness of the incident image varies, however, for example, by controlling the light source 374 and the image formation section 110 (liquid crystal display device 376 in this case) in order to prevent the brightness variation, the image can be displayed with the adjusted brightness.

As shown in FIG. 3C, as a result of the movement of the head 105 by the viewer 100, the viewer 100 views the image with the one-eye (in this case, one-eye 101).

Here, the position of the head 105 of the viewer 100 is detected on the basis of the head picture of the viewer 100 imaged by the imaging section 610, and the target eye detection section 630 can detect with which eye the viewer 100 views. That is, on the basis of a difference between the position of the head 105 in a state illustrated in FIG. 3A and the position of the head 105 illustrated in FIG. 3C, these positions are compared, and thus it can be determined with which eye (any of one-eye 101 and one-eye 102) the viewer 100 views on viewing with one-eye.

That is, while reducing the projection area 113, the movement of the head (eye) of the viewer 100 is imaged by the imaging section 610, the picture is judged by the image judgment section 612, and on the basis of the result, the target eye detection section 630 judges with which eye the viewer 100 views the projected image. The eye determined to view the projected image (the eye on which the image is projected, in this case one-eye 101) is estimated to be the one-eye of the viewer 100 served as the target of the projection position 114, namely, the dominant eye and is detected.

That is, on the basis a difference between the position of the head 105 of the viewer 100 when the light flux 112 is projected in the projection area 113 in which the viewer 100 can view the image with both eyes and the position of the head 105 of the viewer 100 when the light flux is projected in the projection area 113 in which the viewer 100 can view the image with the one-eye after gradually narrowing the projected area 113, the target eye detection section 630 can detect the one-eye of the viewer 100 served as the target of the projection position 114.

As described above, even if the light flux is not projected on the area covering both eyes of the viewer 100, for example, on the basis of the result that the image judgment section 612 has recognized the picture of the viewer 100 in the state of FIG. 3C, the target eye detection section 630 can also judge which eye corresponds to the projection area 113.

That is, when the light flux 112 is projected on the projection area 113 in which the viewer 100 can view the image with the one-eye, the target eye detection section 630 can judge the one-eye (in this case, one-eye 101) with which the viewer 100 views on the basis of the image of the head of the viewer 100 imaged by the imaging section 610, and can detect the one-eye 101 as the one-eye of the viewer 100 served as the target of the projection position 114.

The detected one-eye 101 is estimated to be the dominant eye (ascendant eye). Thus, the detected one-eye by the target eye detection section 630 of the display device 10 of this embodiment is set as a target, thereby the control section 620 can control the projection position 114 of the light flux 112 by controlling the image projection section 115.

In the case where the display device 10 is used for HUD, for example, in the case where an arrow for direction is displayed on a road as a navigation, the arrow is displayed on the one-eye (in this case, one-eye 101) estimated to be the dominant eye, hence the road and the arrow are viewed as unified.

As described above, according to the display device 10 according to this embodiment, the display device can be provided, which can provide the natural and easily viewable image by detecting automatically the one-eye estimated to be the dominant eye and projecting the image on the detected eye.

It is noted that the target of the projection position can be switched between the detected eye described above and the other eye to present the image. Hence, the viewer 100 can change the eye for image presentation between the right and left eyes and can confirm really the easily viewable one-eye.

It can be considered that the one-eye estimated to be the dominant eye is not detected with prescribed significance by the above operation. At this time, the above operation can be repeated, and moreover, as an action in the case where the one-eye estimated to be the dominant eye is not detected, it can be configured so that the image is projected on the right eye of the viewer 100 as a target.

It is noted that the head 105 of the viewer 100 may be imaged directly and the emitted light from any of optical elements constituting the display device 10 may be imaged (for example, through a half mirror or the like).

The adjustment of the image presentation position (projection position 114) to the viewer 100 is performed by the movable mirror 163 in the display device 10 illustrated in FIG. 1, however, not limiting thereto, all optical elements being technically available of various optical elements constituting the display device 10 can be an adjustable subject. For example, the control section 620 can control at least any of optical elements included in the projection section 120 and the image formation section 110.

In the above, the control section 620 can control the projection area 113 (in this example, control of the variable aperture 373) and cooperation of the projection area 113 and the target eye detection section 630.

In the case where the display device 10 of this embodiment is used for HUD and the viewer 100 is a driver (operator), the position of the head (eye) of the viewer 100 does not move largely during driving. Therefore, the control section 620 does not need to control the position of the projection area 113 coupled with the movement of the head (eye) of the viewer 100 in real time, and when the position and angle of the seat are adjusted in driver change, the projection position may be controlled.

Figure 4:
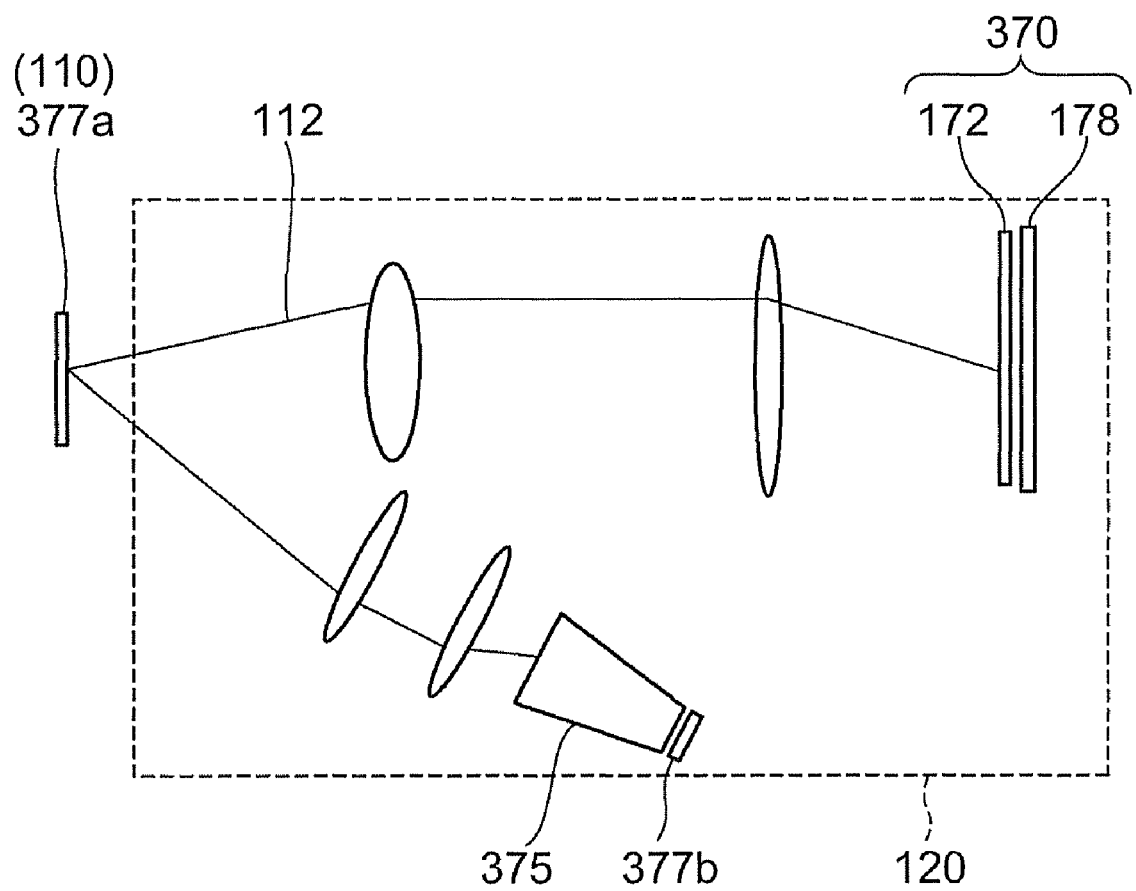
FIG. 4 is a schematic view illustrating the configuration of a part of another display device according to the first embodiment of the invention.

FIG. 4 is a schematic view illustrating the configuration of a part of another display device according to the first embodiment of the invention.

FIG. 4 illustrates the part of the image projection section 115 used for another display device according to this embodiment, namely, the configuration of the part of the projection section 120 and the image formation section 110.

As shown in FIG. 4, in the display device according to this embodiment, the image formation section 110 is based on a DMD 377a.

The projection section 120 includes an LED light source 377b which can control respective emission timing of an LED for red color, an LED for green color and an LED for blue color. The DMD 377a has a fine mirror array serving as a picture element which can control the angle. The light incident to the DMD 377a from the DMD 377b is incident to the mirror array with the controlled angle to be reflected there and to form the picture image.

The angle of diffusion control section 370 is based on a PDLC (Polymer Dispersed Liquid Crystal) 178 with controllable light scattering property and variable light scattering property by applied voltage, and a lens sheet 172 (lenticular screen). However, the invention is not limited thereto, any one with a variable angle of diffusion of the light flux 112 is available.

In the above angle of diffusion control section 370, for example, when the applied voltage to the PDLC 178 is low and the light scattering property of the PDLC is high, the angle diffusion of the light flux 112 is large and the projection area 113 on the head 105 of the viewer 100 is broad. When the applied voltage to the PDLC 178 is high and the light scattering property of the PDLC is low, the angle of diffusion of the light flux 112 is small and the projection area 113 on the head 105 of the viewer 100 is reduced. Thus, the angle of diffusion control section 370 can control the projection area 113 freely.

This allows the operation illustrated in FIG. 3 also in the display device according to this embodiment, and a display device can be provided, which can provide the natural and easily viewable image by detecting automatically the one-eye estimated to be the dominant eye and projecting the image on the detected eye.

FIGS. 5A to 5D are schematic views illustrating optical elements which can be used for the display device according to the first embodiment of the invention.

That is, FIGS. 5A to 5D illustrate optical elements which can be used for the angle of diffusion control section 370 in the display device according to this embodiment.

Figure 5A:
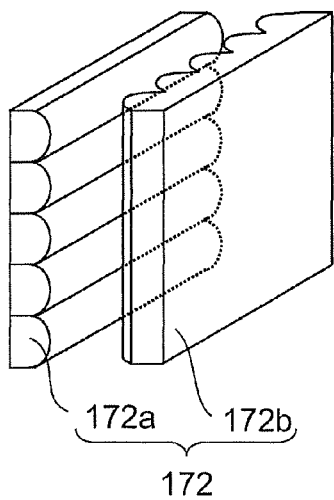
FIGS. 5A to 5D are schematic views illustrating optical elements which can be used for the display device according to the first embodiment of the invention.

As shown in FIG. 5A, the lens sheet 172 illustrated in FIG. 4 can be based on the optical element having two lenticular plates 172a arranged so that extending directions of semi-cylindrical lenses are generally perpendicular and cylindrical lenses are opposed.

Figure 5B:
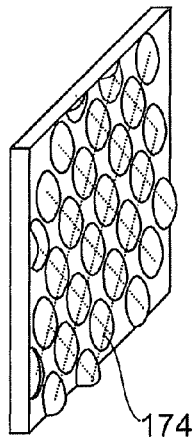

As shown in FIG. 5B, the lens sheet 172 can be based on the optical element having a micro lens array with dome shaped micro lenses 174 aligned in a line on a flat plate.

Figure 5C:
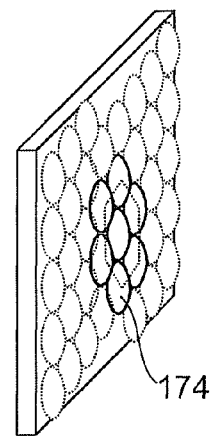

As shown in FIG. 5C, the lens sheet 172 can be based on the optical element having a micro lens array with dome shaped micro lenses 174 arranged in a hexagonal close packing on a flat plate.

Figure 5D:
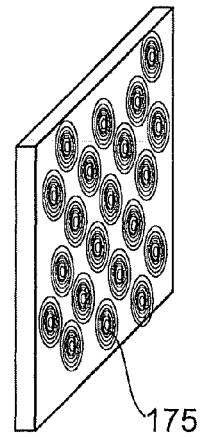

Furthermore, as shown in FIG. 5D, the lens sheet 172 can be based on the optical element having a micro lens array with grated index type micro lenses 175 arrayed two dimensionally with a generally circular refractive index distribution on a flat plate.

Furthermore, the lens sheet 172 can be based on a holographic diffuser having fine concavity and convexity on a surface, and being able to control the angle of diffusion by varying the shape and size of the fine concavity and convexity and arrangement density or the like. In addition, other than the above, various optical elements, for example, a prism sheet having a plurality of crests and grooves shaped like a triangle pole arranged in parallel, various louver sheets, arrangement of a plurality of waveguides shaped like a top truncated triangular pyramid or the like can be used for the angle of diffusion control section 370.

In stead of the PDLC 178 in the angle of diffusion control section 370 illustrated in FIG. 4, various optical elements with optical characteristics being illustratively variable by an electrical signal, for example, a structure having fine particles dispersed in a nematic liquid crystal layer, and a diffraction lattice type liquid crystal element having a liquid crystal sandwiched between electrodes micro-patterned can be used.

Second Embodiment

Figure 6:
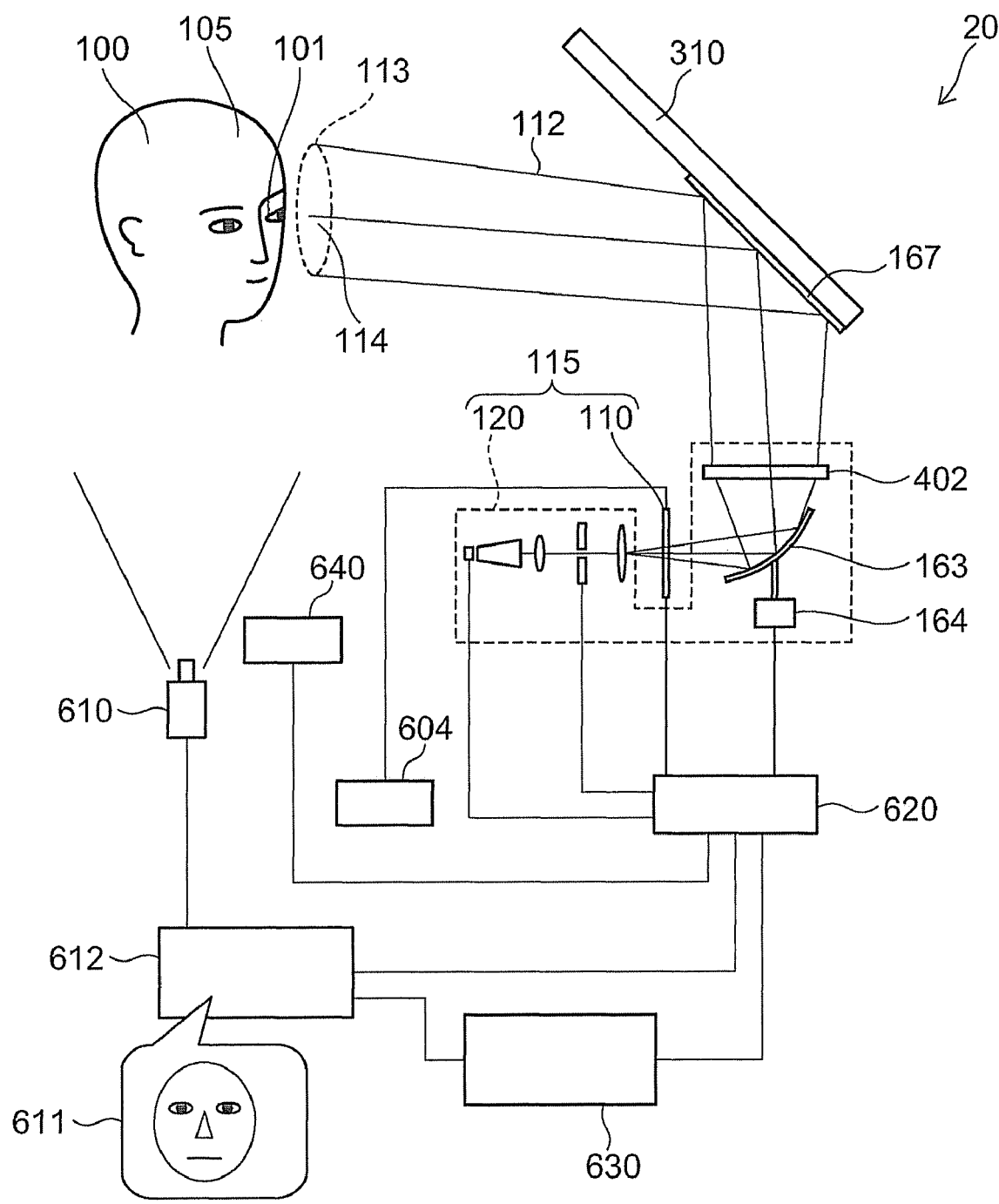
FIG. 6 is a schematic view illustrating the configuration of a display device according to a second embodiment of the invention.

FIG. 6 is a schematic view illustrating the configuration of a display device according to a second embodiment of the invention.

As shown in FIG. 6, the display device 20 according to the second embodiment of the invention further includes an interface 640 through which the viewer 100 can set by oneself the one-eye of the viewer 100 served as a target of the projection position 114 with respect to the display device 10 illustrated in FIG. 1.

Thus, in the case where the one-eye detected by the target eye detection section 630 is set as a target of the projection position 114 to project the image thereon, if the viewer 100 feels hard to view, the other eye can be set as a target of the projection position 114, and then it is convenient.

That is, the viewer 100 can manually change and set the eye served as a target of the projection position 114 of the image.

The driver may want to look at road situation ahead and may not want to watch the navigation image temporally. Therefore, the interface 640 can suitably set responsibility of control of the projection position caused to follow the position of the head (eye) of the viewer 100, and interrupt the operation of projection.

In the above, the interface 640 may be configured to include an input section and a display section, and the input section can be based on not only contact style such as an input button and a touch panel or the like but also non-contact style such as voice input or the like. Particularly, the non-contact style input section like the voice input style or the like is convenient because input is possible without changing a posture for viewing the image of the viewer 100.

Thus, the display device 20 according to this embodiment can provide a display device which can provide the natural and easily viewable image more conveniently by detecting automatically the one-eye estimated to be the dominant eye and projecting the image on the detected eye.

Third Embodiment

Figure 7:
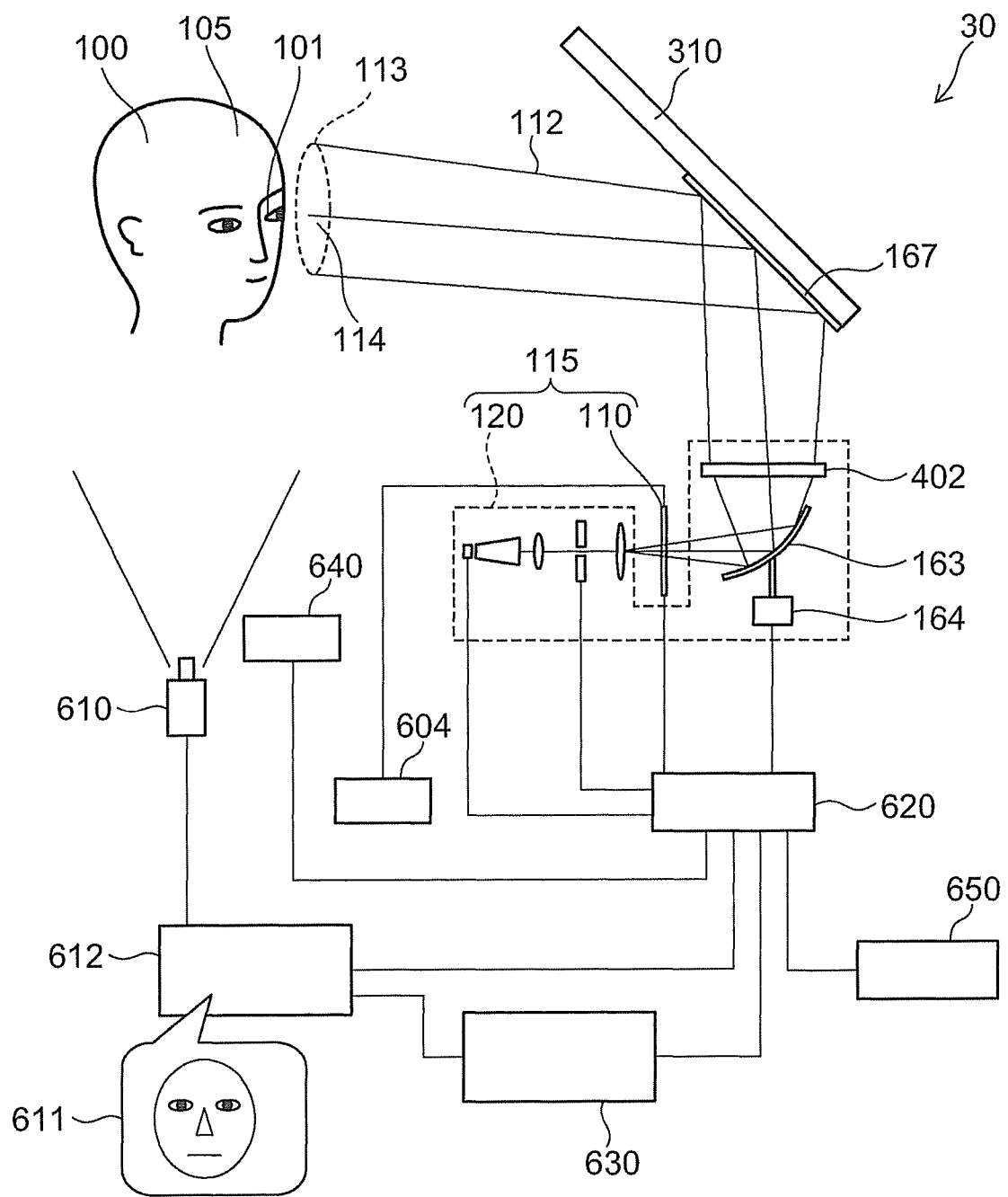
FIG. 7 is a schematic view illustrating the configuration of a display device according to a third embodiment of the invention.

FIG. 7 is a schematic view illustrating the configuration of a display device according to a third embodiment of the invention.

As shown in FIG. 7, the display device 30 according to the third embodiment of the invention further includes a memory section 650 storing the targeted one-eye for each viewer. The control section 620 set the target on the targeted one-eye stored in the memory section 650 to control the projection position 114 with respect to the display device illustrated in FIG. 6.

The viewer 100 has each dominant eye, however if the one-eye estimated to be the dominant eye is once detected, thereafter the one-eye estimated to be the dominant eye has little chance to change.

Therefore, the one-eye targeted for each viewer is stored in the memory section 650, if the viewer changes, the one-eye (dominant eye) targeted corresponding to the viewer may be adopted.

In the case where the display device 30 of this embodiment is used for HUD and the viewer 100 is a driver (operator), when the position and angle of the seat are adjusted in driver change, on the basis of data about the one-eye estimated to be the dominant eye for each driver stored in the memory section 650, the projection position 114 can be controlled, and detection operation by the target eye detection section 630 needs not to be performed for every driver change to lead to efficiency improvement and convenience.

Thus, the display device 30 according to this embodiment can provide a display device which can provide the natural and easily viewable image more conveniently by detecting automatically the one-eye estimated to be the dominant eye and projecting the image on the detected eye.

Furthermore, on the basis of the picture imaged by the imaging section 610, the viewer 100 (driver) can be recognized and identified. Moreover, on the basis of the identification result of the viewer 100, the control section 620 can set the target on the stored one-eye corresponding to the identified viewer to control the projection position 114. That is, when the viewer 100 is automatically recognized and is the viewer 100 previously stored in the memory section 650, the projection position is controlled using the data of the one-eye previously registered and stored. When the viewer 100 is not the stored viewer, the target eye detection section 630 detects the targeted one-eye (dominant eye) of the viewer 100. Thus, the display device which is more efficient and more convenient can be provided.

Fourth Embodiment

Figure 8:
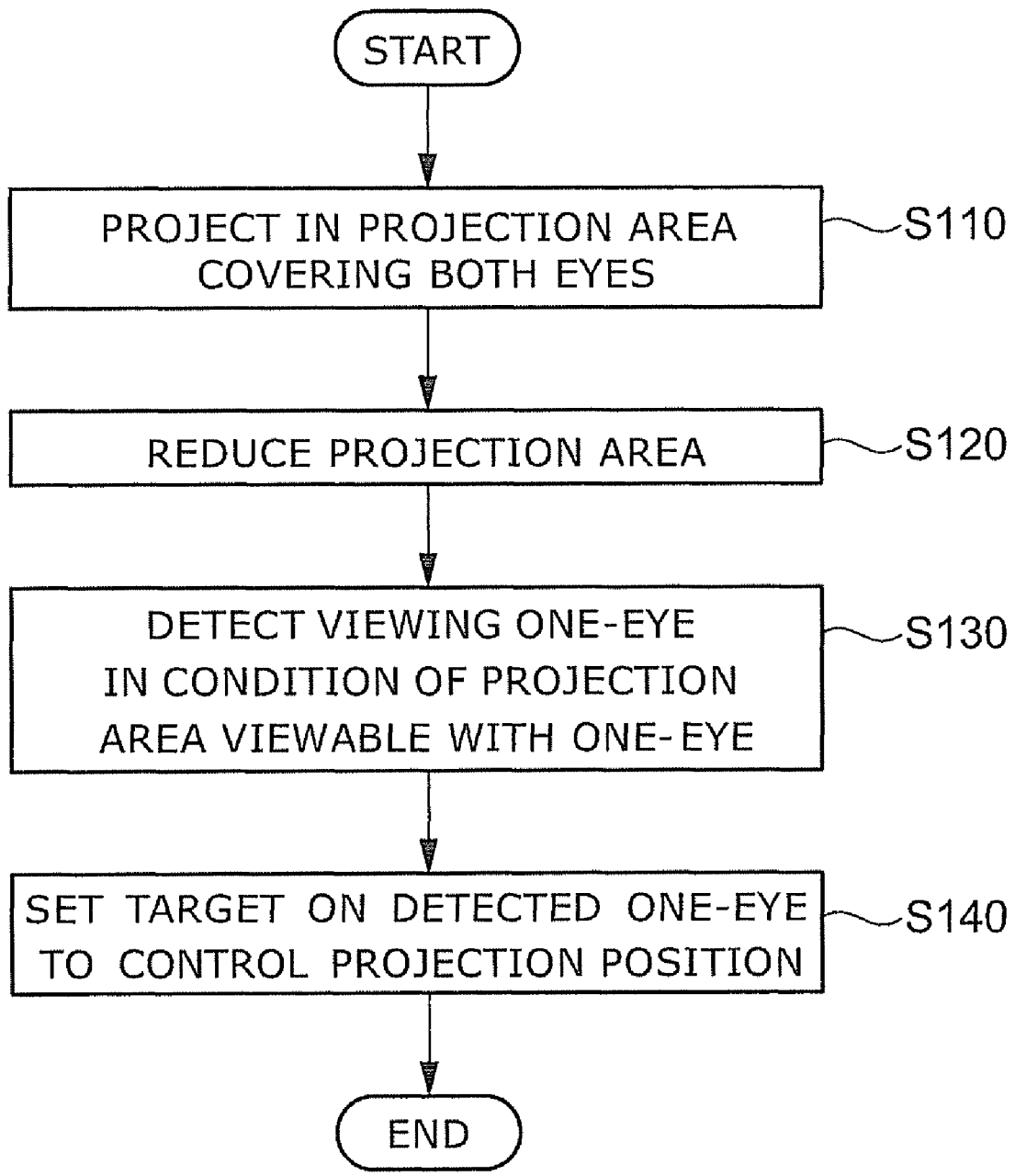
FIG. 8 is a flow chart illustrating a display method according to a fourth embodiment of the invention.

FIG. 8 is a flow chart illustrating a display method according to a fourth embodiment of the invention.

As shown in FIG. 8, in the display method according to the fourth embodiment of the invention, first, the light flux including the image is projected on the viewer 100 in the projection area 113 covering both eyes of the viewer 100 (step S110). That is, as illustrated in FIG. 3A, the light flux 112 is projected on the head 105 of the viewer 100 in the broad projection area 113.

The projection area 113 is gradually reduced (step S120). That is, as illustrated in FIG. 3B, the opening area of the variable aperture 373 is illustratively reduced so that the projection area 113 is gradually reduced toward a center of both eyes of the viewer 100.

When the light flux 112 is projected in the projection area 113 in which the viewer 100 can view the image with the one-eye (unable to view with both eyes), the one-eye with which the viewer 100 views is detected (step S130).

That is, for example, as illustrated in FIG. 3C, the eye used for viewing when the viewer 100 views with a one-eye can be detected from the difference between the position of the head 105 in the step S110 and the position of the head 105 in the step S130. Moreover, the eye used for viewing with which the viewer 100 views with a one-eye can be detected by recognition of the picture image.

The detected one-eye is targeted to control and display the projection position of the light flux 112 (step S140).

Thus, the display method according to this embodiment can provide the display method which can provide the natural and easily viewable image by detecting automatically the one-eye estimated to be the dominant eye and projecting the image on the detected eye.

In the above step S130, it is also considered that the one-eye estimated to be the dominant eye is not detected. As a response to this, for example, the right eye of the viewer 100 may be targeted to project the image.

Moreover, the viewer 100 may manually change and set the eye served as an adjustment target of the projection position 114 of the image.

Fifth Embodiment

A head-up display (HUD) of a fifth embodiment of the invention is a head-up display for a car for which the display device and display method described above are used.

Figure 9:
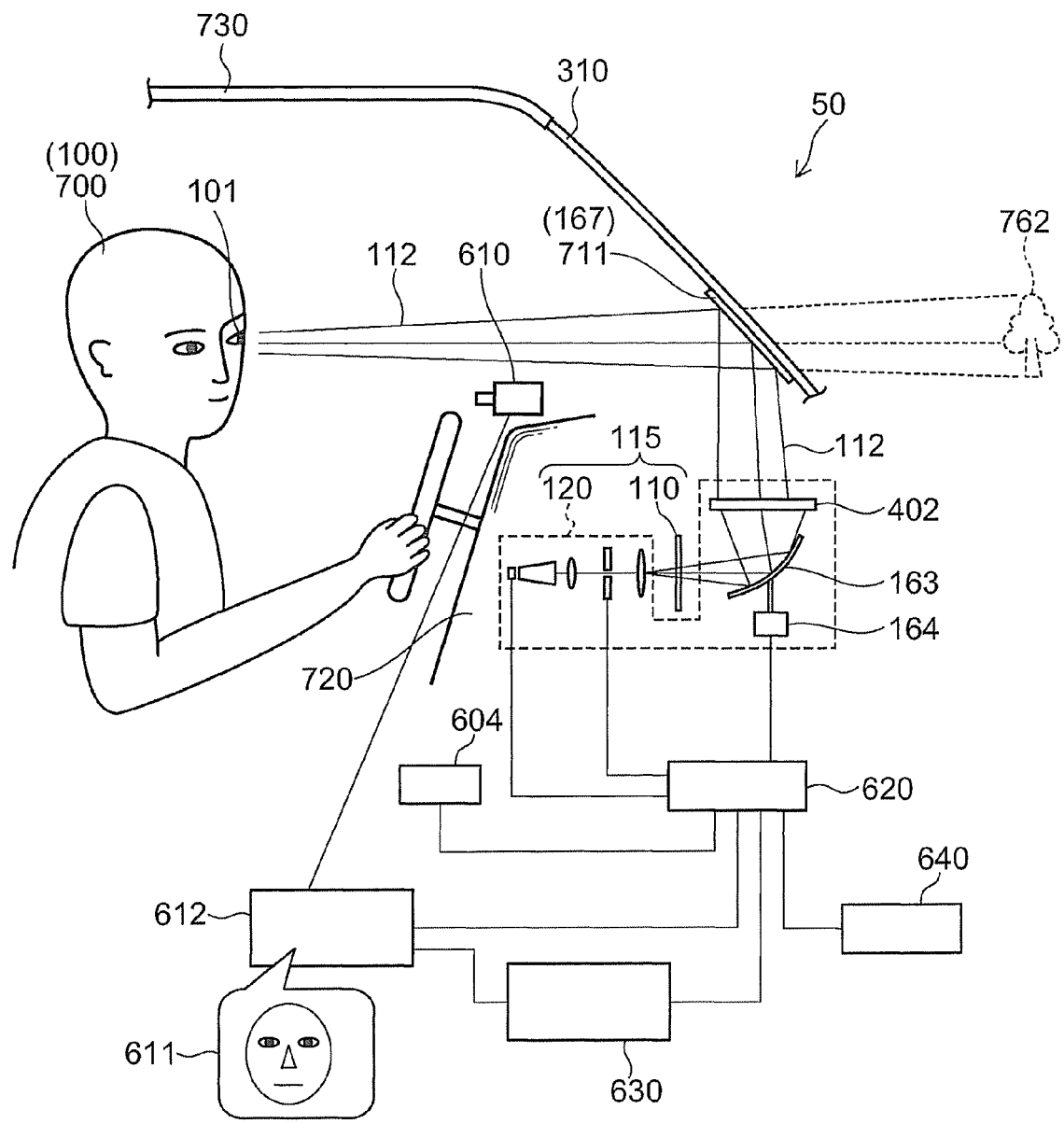
FIG. 9 is a schematic view illustrating the configuration of a head-up display according to a fifth embodiment of the invention.

FIG. 9 is a schematic view illustrating the configuration of the head-up display according to the fifth embodiment of the invention.

As shown in FIG. 9, the head-up display (HUD) 50 according to the fifth embodiment of the invention is provided with the image projection section 115 of this embodiment of the invention, the imaging section 610, the control section 620 and the target eye detection section 630. Furthermore, for example, the image projection section 115, the control section 620 and the target eye detection section 630 are provided on the back of a dashboard 720 of a car (vehicle) 730 viewed from a driver 700 (viewer 100). The imaging section 610 is illustratively incorporated in the dashboard 720.

Moreover, a reflecting layer 167 (half mirror having semi-transmission property 711) reflecting the light flux 112 is provided on a part of a windshield (transparent plate) 310 of the car 730. The reflecting layer 167 functions as a combiner of HUD and the driver 700 views a projected image 762 including the image.

The head-up display 50 according to this embodiment detects automatically the one-eye estimated to be the dominant eye of the driver 700 (viewer 100) by the target eye detection section 630, and projects the image with setting a target on the detected eye using the control section 620, and consequently the natural and easily viewable image can be provided.

Figure 10:
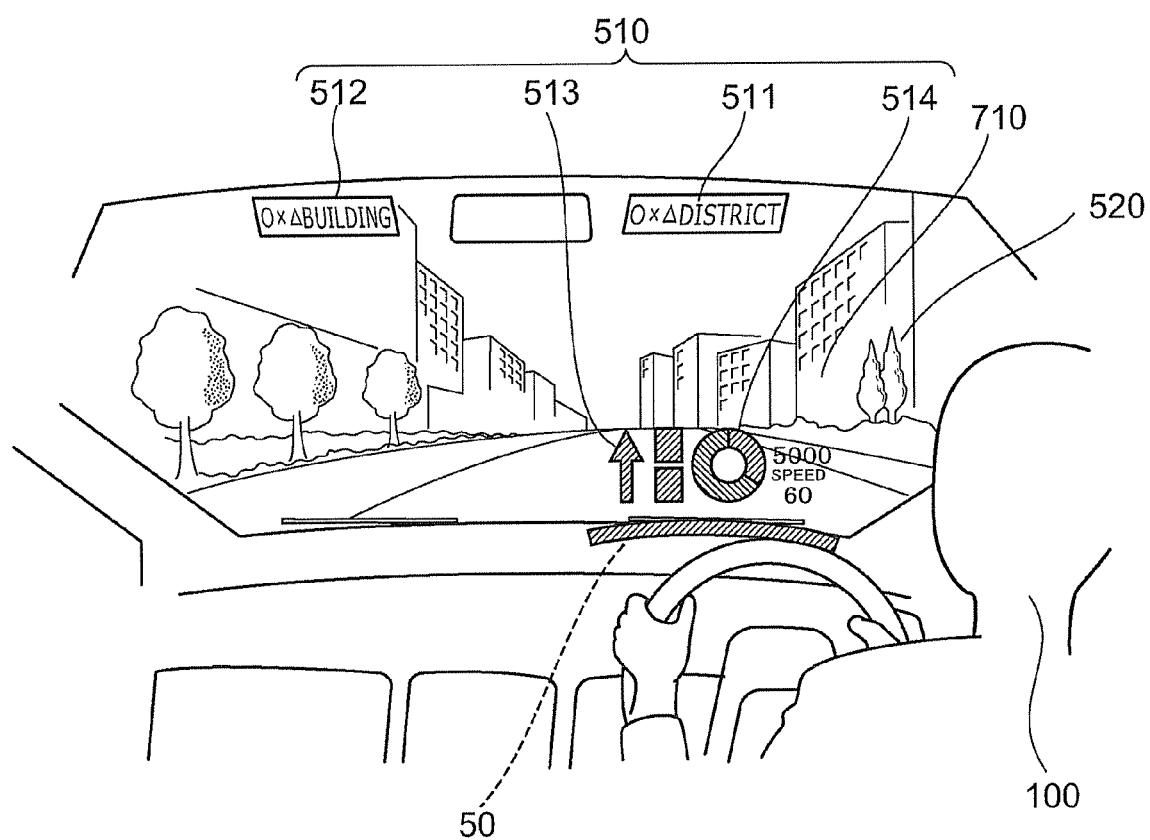
FIG. 10 is a schematic view illustrating the service conditions of the head-up display according to the fifth embodiment of the invention.

FIG. 10 is a schematic view illustrating the service conditions of the head-up display according to the fifth embodiment of the invention.

As shown in FIG. 10, in the head-up display 50 of the fifth embodiment of the invention, a display image 510 such as, for example, a present location 511, surrounding building information or the like 512, a course indication arrow 513, vehicle information or the like 514 of speed and fuel or the like is projected on a reflecting part (not shown) of the windshield 310 to be displayed. Thereby, the driver (viewer) 700 views an external image 520 and the display image 510 simultaneously.

The head-up display 50 according to this embodiment detects automatically the one-eye estimated to be the dominant eye of the driver 700 (viewer 100) by the target eye detection section 630, and projects the image on the detected eye, and consequently the natural and easily viewable image can be provided.

That is, the image can be presented to the dominant eye of the viewer 100 and it is possible to support a travel of vehicle or the like in more safety and efficiently.

Figure 11:
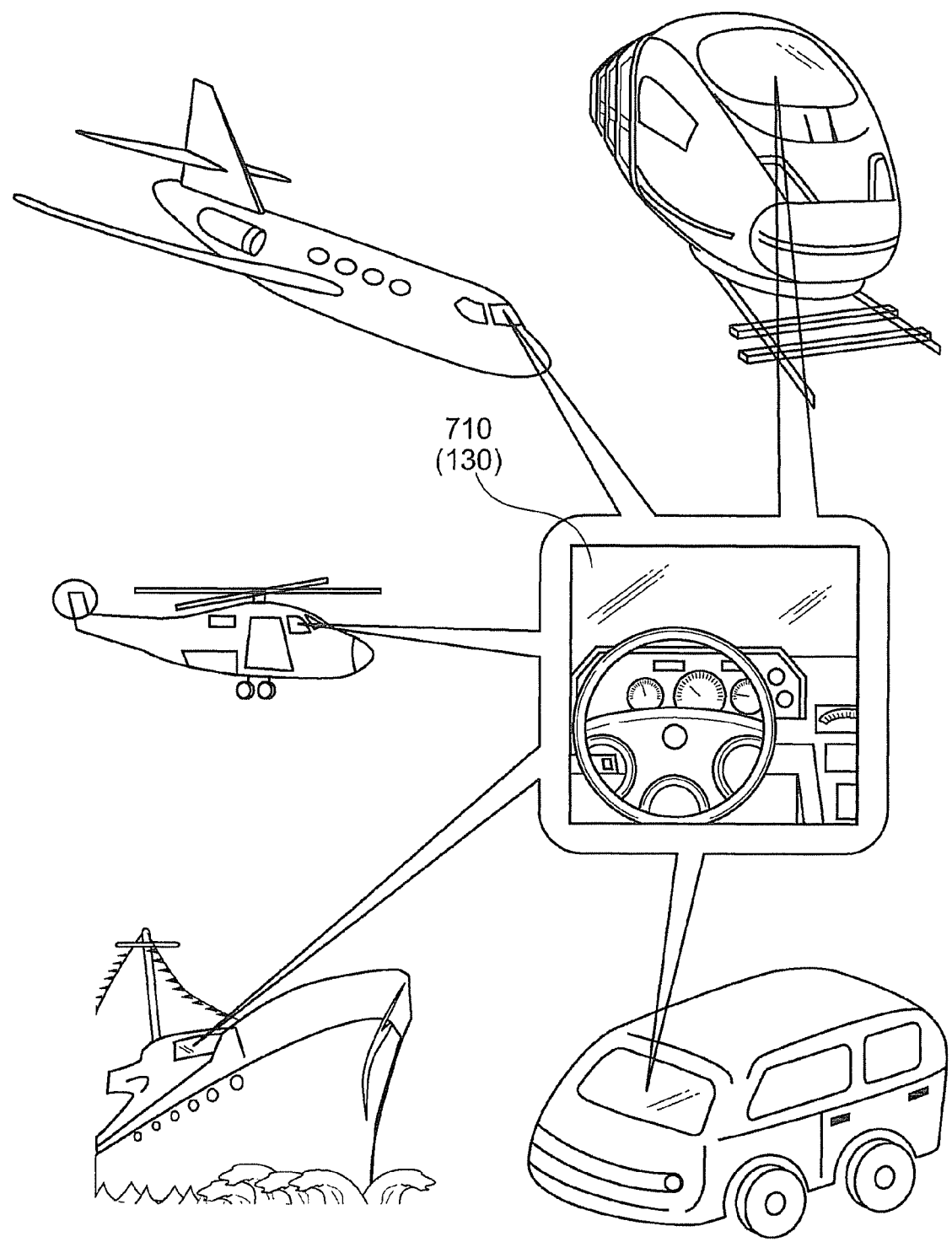
FIG. 11 is a schematic view for describing application examples of the display device, the display method and the head-up display according to the embodiments of the invention.

FIG. 11 is a schematic view for describing application examples of the display device, the display method and the head-up display according to the embodiments of the invention.

As shown in FIG. 11, the described above display device, the display method and the head-up display according to the embodiments of the invention can be applied to various movable bodies such as a train, an aircraft, a helicopter and a ship or the like other than the vehicle of car or the like.

The embodiments of the invention have been described with reference to the examples. However, the invention is not limited to these examples. For example, the specific configuration of respective elements comprising the display device, the display method and the head-up display are encompassed within the scope of the invention as long as a person skilled in the art may also work the invention by selecting as appropriate from the publicly known scope and take the similar effect.

Moreover, two or more of the elements in each example can be combined as long as technically feasible, and such combinations are also encompassed within the scope of the invention as long as they include the features of the invention.

In addition, all display devices, display methods and head-up displays which a person skilled in the art may invent within the range of design variation on the basis of the display device, the display method and the head-up display described above as the embodiments of the invention also belong to the scope of the invention as long as they include the features of the invention.

In addition, a person skilled in the art could have made various conversions and modifications within the category of the idea of the invention, and such conversions and modifications are considered to belong to the scope of the invention.

The invention claimed is:

1. A display device comprising:
an image projection section configured to project a light flux including an image toward a head of an viewer;
an imaging section configured to image a picture of the viewer;
a control section configured to control a projection area and a projection position of the light flux by controlling the image projection section on the basis of the picture; and
a target eye detection section configured to detect a one-eye served as a target of the projection position of both eyes of the viewer on the basis of the picture.

2. The device according to claim 1, wherein the target eye detection section detects with which of right and left eyes the viewer receives the image in a condition that the projection area of the light flux is smaller than an area covering both eyes of the viewer.

3. The device according to claim 2, wherein the image projection section adjusts to close brightness of the image in a condition that the projection area of the light flux covers both eyes of the viewer to brightness of the image in a condition that the projection area of the light flux is smaller than an area covering both eyes of the viewer.

4. The device according to claim 1, wherein the target eye detection section detects the one-eye served as a target of the projection position on the basis of the picture in a condition that the projection area of the light flux covers both eyes of the viewer and the picture in a condition that the projection area of the light flux is reduced to be smaller than an area covering both eyes of the viewer.

5. The device according to claim 4, wherein the image projection section adjusts to close brightness of the image in a condition that the projection area of the light flux covers both eyes of the viewer to brightness of the image in a condition that the projection area of the light flux is smaller than an area covering both eyes of the viewer.

6. The device according to claim 1, wherein the image projection section has a variable aperture and varies an opening diameter of the variable aperture to vary the projection area of the light flux.

7. The device according to claim 1, wherein the image projection section includes an angle of diffusion control section configured to vary the projection area of the light flux by varying an angle of diffusion of the light flux.

8. The device according to claim 7, wherein the angle of diffusion control section includes an optical layer with variable light scattering property.

9. The device according to claim 7, wherein the angle of diffusion control section includes a polymer dispersed liquid crystal layer.

10. The device according to claim 1, wherein the image projection section includes an image formation section configured to form an image and a projection section configured to project a light flux including the image toward the head of the viewer.

11. The device according to claim 10, wherein the image formation section includes at least any of a liquid crystal display device, DMD (Digital Micromirror Device) and MEMS (Micro-electro-mechanical System).

12. The device according to claim 10, wherein the projection section includes a movable reflector and control an angle of the reflector to adjust the projection position of the light flux.

13. The device according to claim 1, wherein the control section controls the projection position with setting a target on the one-eye detected by the target eye detection section.

14. The device according to claim 1, further comprising:
a memory section configured to store the targeted one-eye for each of the viewer,
the control section controlling the projection position with setting a target on the targeted stored one-eye.

15. The device according to claim 14, wherein the viewer is recognized on the basis of the picture and the control section controls the projection position with setting a target on the targeted stored one-eye of the detected viewer.

16. A display method,
detecting a one-eye with which a viewer views a light flux in a condition that a projection area of the light flux including an image is smaller than an area covering both eyes of the viewer, and
adjusting and displaying a projection position of the light flux with setting a target on the detected one-eye.

17. The method according to claim 16, detecting the one-eye with which the light flux is viewed, on the basis of the picture in a condition that the projection area of the light flux covers both eyes of the viewer and the picture in a condition that the projection area of the light flux is reduced to be smaller than the area covering both eyes of the viewer.

18. A head-up display comprising:
a display device including an image projection section configured to project a light flux including an image toward a head of a viewer, an imaging section configured to image a picture of the viewer, a control section configured to control a projection area and a projection position of the light flux by controlling the image projection section on the basis of the picture, and a target eye detection section configured to detect a one-eye served as a target of the projection position of both eyes of the viewer on the basis of the picture, and
a transparent plate provided with a reflecting layer on which the light flux emitted from the display device is projected.

19. The head-up display according to claim 18, wherein the reflecting layer has semi-transmission property.

20. The head-up display according to claim 18, wherein the transparent plate is a windshield of a vehicle.

* * * * *